United States Patent [19]

Ando et al.

[11] Patent Number: 5,447,978
[45] Date of Patent: Sep. 5, 1995

[54] CURABLE COMPOSITION

[75] Inventors: Naotami Ando, Hyogo; Hisao Furukawa; Yasushi Kato, both of Kobe, all of Japan

[73] Assignee: Kanegafuchi Kagaku Kogyo Kabushiki Kaisha, Osaka, Japan

[21] Appl. No.: 136,596

[22] Filed: Oct. 14, 1993

Related U.S. Application Data

[63] Continuation of Ser. No. 587,556, Sep. 24, 1990, abandoned, which is a continuation of Ser. No. 177,800, Apr. 5, 1988, abandoned, which is a continuation-in-part of Ser. No. 911,617, Sep. 25, 1986, abandoned.

[30] Foreign Application Priority Data

Sep. 30, 1985 [JP] Japan ................ 60-218413

[51] Int. Cl.⁶ ............................ C08K 5/37
[52] U.S. Cl. ..................... 524/289; 524/302; 524/330; 524/368; 524/392; 524/750
[58] Field of Search ............ 525/100, 326.5, 346, 525/350, 446, 419, 437; 526/279; 524/289, 302, 330, 368, 392, 750

[56] References Cited

U.S. PATENT DOCUMENTS

| | | | |
|---|---|---|---|
| 4,191,713 | 3/1980 | Yonezawa et al. | 525/100 |
| 4,477,628 | 10/1984 | Kato et al. | 525/100 |
| 4,478,990 | 10/1984 | Kohno et al. | 525/326.5 |
| 4,506,052 | 3/1985 | Furukawa et al. | 525/100 |
| 4,614,777 | 9/1986 | Kania | 526/279 |

FOREIGN PATENT DOCUMENTS 0050248  4/1982  European Pat. Off. ......... 525/326.5

*Primary Examiner*—Ralph H. Dean
*Attorney, Agent, or Firm*—Armstrong, Westerman, Hattori, McLeland and Naughton

[57] ABSTRACT

A curable composition comprising as effect components:

(A) 100 parts by weight of at least one member selected from the group consisting of a polyester, an ether ester block-copolymer, a vinyl polymer, a diallyl phthalate compound, a diallyl phthalate copolymer and an epoxy compound, said component (A) having in its molecule at least one silyl group represented by the formula (I):

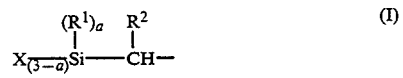

(B) 0.0001 to 50 parts by weight of an organotin compound, and
(C) 0.1 to 20 parts by weight of a mercapto group-containing compound. The curable composition has well balanced pot life and curability and provides a cured product having an excellent appearance.

14 Claims, No Drawings

CURABLE COMPOSITION

This application is a continuation of application Ser. No. 07/587,556, filed Sep. 24, 1990, abandoned, which application was a continuation of Ser. No. 07/177,800, filed Apr. 5, 1988, abandoned, which application was a continuation-in-part of Ser. No. 06/911,617, filed Sep. 25, 1986, abandoned.

BACKGROUND OF THE INVENTION

The present invention relates to a curable composition, and more particularly to a curable composition comprising a compound having a silyl group at the molecular ends and capable of curing at room temperature with moisture, an organotin compound being a silanol condensing catalyst and a mercapto group-containing compound used as a pot life controlling agent. A compound having a silyl functional group capable of curing with moisture at the molecular end is useful for paints, coating agents, adhesives, sealants, and the like.

The curability of the silyl group-containing compound is greatly affected by the kinds of curing agents, and accordingly selection of the curing agents suited for the purposes is indispensable. For instance, a paint composition containing the silyl group-containing compound and organotin compound is poor in balance between the pot life, the appearance and the curability, and may cause problems in practical use, e.g. the use as automotive refinishing paint. That is to say, when the content of the organotin compound is decreased, though the pot life and the appearance are satisfactory, the curability is poor. On the other hand, when the content of the organotin compound increased, though the curability is satisfactory for practical use, the pot life and the appearance are remarkably lowered.

An object of the present invention is to provide a curable composition having well balanced pot life and curability and providing a cured product having good appearance.

The above and other objects of the present invention will become apparent from the description hereinafter.

SUMMARY OF THE INVENTION

It has now been found that when a mercapto group-containing compound is added to an organotin compound, the mixture can be used as an important curing agent, and by the use of the combination, the pot life of a composition and the appearance of the cured product are improved and the catalytic activity is scarcely lowered.

In accordance with the present invention, there is provided a curable composition comprising as effective components:
(A) 100 parts by weight of at least one member selected from the group consisting of a polyester, an ether ester block-copolymer, a vinyl polymer, a diallyl phthalate compound, a diallyl phthalate copolymer and an epoxy compound, the component (A) having in its molecule at least one silyl group represented by the formula (I):

wherein $R^1$ and $R^2$ are the same or different and each is a hydrogen atom or a monovalent hydrocarbon group having 1 to 10 carbon atoms selected from the group consisting of alkyl group, aryl group and aralkyl group; X is a halogen atom or a group selected from the group consisting of an alkoxyl group, an acyloxyl group, a ketoxymate group, amide group, an acid amide group, aminoxy group and mercapto group; and a is 0, 1 or 2,
(B) 0.0001 to 50 parts by weight of an organotin compound, and
(C) 0.1 to 20 parts by weight of a mercapto group-containing compound selected from the group consisting of an alkyl mercaptan, a mercapto group-containing carboxylic acid, a mercapto group-containing ester compound, a mercapto group-containing polyether, thiophenol and thiobenzoic acid.

DETAILED DESCRIPTION

In the present invention, the silyl group-containing compound (A) can be prepared in various processes. As processes for preparing the silyl group-containing compound (A), there are, for instance, (1) a process by hydrosilylation of a vinyl resin having carbon-carbon double bond with hydrosilane, (2) a process by copolymerization of a vinyl compound and a silyl compound having a copolymerizable double bond, (3) a process by reaction of a compound having epoxy group with aminosilane or mercaptosilane, and the like. The processes (1) and (2) are described in Japanese Unexamined Patent Publications No. 36395/1979 and No. 63351/1982, Japanese Examined Patent Publication No. 1423/1984, and the like. In the process (3), the epoxy compound can be obtained by reacting the epoxy resin such as a bisphenol A epoxy resin, an epoxyuretane epoxy resin or a novolac epoxy resin with the aminosilane compound such as γ-aminopropyltrimethoxysilane, γ-aminopropyltriethoxysilane or γ-(2-aminoethyl)aminopropyltrimethoxysilane or the mercaptosilane compound such as γ-mercaptopropyltrimethoxysilane. The reaction is carried out by mixing the above components with stirring at 70° to 80° C. for several hours in a solvent such as toluene or xylene in the absence of water.

The silyl group-containing compound (A) has in its molecule at least one silyl group represented by the formula (I):

wherein $R^1$ and $R^2$ are the same or different and each is hydrogen atom or a monovalent hydrocarbon group having 1 to 10 carbon atoms selected from the group consisting of alkyl group, aryl group and aralkyl group, X is a halogen atom or a group selected from the group consisting of an alkoxyl group having preferably 1 to 5 carbon atoms, an acyloxy group having preferably 2 to 6 carbon atoms, a ketoxymate group, amide group, acid amide group, aminoxy group and mercapto group, and a is 0, 1 or 2.

The silyl group-containing compounds (A) used in the invention are desired to have a molecular weight within the range of 200 to 30,000, though the molecular weight thereof is not particularly limited thereto. The silyl group containing compound (A) may be employed alone or admixture thereof.

In the invention, silyl group-containing compounds (A) are selected from the group consisting of a polyester, an ether ester block-copolymer, a vinyl polymer, a diallyl phthalate compound, a diallyl phthalate copolymer and an epoxy compound.

Examples of the polyester are, for instance, a polyester composed of phthalic anhydride with allyl glycidyl ether, $\gamma$-glycidoxypropyltrimethoxysilane or propylene oxide, and the like. It is preferable that the silyl group-containing polyester has a molecular weight of 300 to 8,000. Examples of the ether ester block-copolymer are, for instance, a polyether ester composed of the above-mentioned polyester and alkylene oxide polymer such as polyethylene oxide or polypropylene oxide, and the like. It is preferable that the silyl group-containing ether ester block-copolymer has a molecular weight of 300 to 20,000, and that the ether moiety in the ether ester block-copolymer has a molecular weight of 100 to 500. Examples of the vinyl polymer are, for instance, vinyl polymers composed of at least one member selected from styrene, methyl methacrylate, allyl methacrylate and $\gamma$-methacryloxypropyltrimethoxysilane, and the like. It is preferable that the silyl group-containing vinyl polymer has a molecular weight of 300 to 20,000, and that the vinyl polymer includes acrylic ester or methacrylic ester. Examples of the diallyl phthalate compound or the diallyl phthalate copolymer are, for instance, diallyl phthalate monomer or prepolymer, a copolymer of diallyl phthalate monomer or prepolymer with acrylic ester or methacrylic ester. There are preferable the silyl group-containing diallyl phthalate monomer, the silyl group-containing diallyl phthalate prepolymer having a molecular weight of not more than 20,000, and the silyl group-containing copolymer of diallyl phthalate and an acrylic ester or a methacrylic ester having a molecular weight of 300 to 20,000. Examples of the acrylic or methacrylic ester are, for instance, alkyl acrylate or methacrylate such as methyl acrylate, methyl methacrylate, butyl acrylate or butyl methacrylate, allyl acrylate or methacrylate, stearyl acrylate or methacrylate, $\gamma$-acryloxypropyltrimethoxysilane, $\gamma$-methacryloxypropyltrimethoxysilane, and the like. In the copolymer of the diallyl phthalate and the acrylic ester or the methacrylic ester, it is preferable that the content of diallyl phthalate is from 5 to 100% by mole.

As the organotin compound (B) used in the present invention, there are preferable, for instance, carboxylic acid organotin compounds such as tin octate, dibutyl tin dilaulate and dioctyl tin maleate, sulfide or mercapto organotin compounds such as monobutyl tin sulfide and dioctyl tin mercaptide, organotin oxides such as dioctyl tin oxide, compounds obtained by reacting organotin oxides with ester compounds such as ethyl silicate, Ethyl Silicate 40 (commercial name of partially hydrolyzed ethyl silicate made by Nippon Unicar Co., Ltd.), dimethyl maleate and dioctyl phthalate, and the like. The amount of the catalyst (B) is from 0.0001 to 50 parts by weight, preferably from 0.001 to 30 parts by weight, more preferably, from 0.01 to 20 parts by weight, based on 100 parts by weight of the silyl group-containing compound (A).

As the mercapto group-containing compound (C) used in the present invention, there are exemplified, for instance, alkyl mercaptans such as n-dodecyl mercaptan and tert-butyl mercaptan, carboxylic acids such as 2-mercaptopropionic acid and thiosalycilic acid, ester compounds such as 2-ethylhexyl thioglycolate, polymers such as CAPICURE 3-800 (a polyether having mercapto groups at the side ends) commercially available from Diamond Shamrock Corp., other mercapto group-containing compounds such as thiophenol and thiobenzoic acid, and the like. Among them, n-dodecyl mercaptan is preferable. The amount of the mercapto group-containing compound (C) is 0.1 to 20 parts by weight, preferably from 1 to 15 parts by weight, based on 100 parts by weight of the silyl group-containing compound (A).

The organotin compound (B) and the mercapto group-containing compound (C) may be added to the silyl group-containing compound (A) separately or in the state of a mixture previously prepared by mixing them in a predetermined ratio.

The composition according to the present invention can be prepared into a two-package composition in which prior to the use, a composition containing the silyl group-containing compound (A) is admixed with a composition containing the organotin compound (B) and the mercapto group-containing compound (C), or can be prepared into a one-package composition in which a stabilizer is added to a mixture of components (A), (B) and (C) and the mixture is stored in the state of no moisture being incorporated therein and is used as it is.

A solvent may be employed in the present invention. The amount of the solvent varies depending on the molecular weight of the silyl group-containing compound and the proportions of the used components, and is selected according to the concentration of solids matter or viscosity of the composition required in practical use. Examples of the solvent are, for instance, toluene, xylene, butyl acetate, and the like.

The composition of the present invention can further contain usual additives such as various fillers, pigments, ultraviolet absorbents, antioxidants, delustering agents and levelling agents in known effective concentrations.

The composition of the present invention is curable in a wide temperature range from room temperature to high temperature in a short period of time, and provides a cured product having excellent properties such as adhesion and weatherability. Accordingly, the composition of the invention is useful for various purposes, e.g. paints, coating materials, primers and adhesives for the surfaces of inorganic and organic materials. The composition is particularly suitable as an anti-corrosive finishing paint for a bridge, a top coat, an automotive refinishing paint and a paint for the surfaces of organic materials, because it is curable at a low temperature.

It is possible to blend the composition of the invention with various resins used in paints, coating materials, primers and adhesives. Therefore, the composition of the invention can be admixed in suitable proportions, for instance, with lacquer, acrylic lacquer, thermosetting acrylic paint, alkyd paint, melamine paint, epoxy paint or silicone paint, whereby the physical properties such as adhesion and weathering resistance of these paints or coatings can be improved.

The present invention is more specifically described and explained by means of the following Examples in which all parts and % are by weight unless otherwise noted. It is to be understood that the present invention is not limited to the Examples, and various changes and departing from the spirit and scope thereof.

PREPARATION EXAMPLE 1

A mixture of 150 g of styrene, 300 g of butyl acrylate, 430 g of methyl methacrylate, 100 g of $\gamma$-methacryloyloxypropyltrimethoxysilane, 20 g of acrylamide and 18 g of azobisisobutyronitrile was added dropwise to 450 g of xylene heated at 110° C. under reflux for 5 hours, to which a mixture of 1 g of azobis isobutyronitrile and 90 g of xylene was further added dropwise for 1 hours, and the post-polymerization was carried out for 2 hours to give a solution having a solid concentration of 64%. The viscosity of the obtained solution was 120 poises at 25° C. The obtained silyl group-containing compound had a number average molecular weight of 10,000 measured by gel permeation chromatography.

EXAMPLES 1 TO 5 AND COMPARATIVE EXAMPLE 1

There was diluted 156 parts of the silyl group-containing compound obtained in Preparation Example 1 with xylene so that the solid concentration was 35%, to which 2 parts of dioctyl tin maleate and 1 part of each of mercapto group-containing compounds shown in Table 1 were added to give a curable composition. The obtained composition was sprayed on a mild steel plate previously coated with a lacquer primer surfacer. After allowing to stand at 20° C. for 30 minutes for setting, the curability at 60° C., the pot life at 20° C. and other physical properties were measured.

The above procedure was repeated except that the mercapto group-containing compound was not used.

The results are shown in Table 1.

In the Examples, the measurement was made as follows:

[Appearance]

A surface of a clear coating of the composition formed on the above-mentioned lacquer undercoat is observed.

Evaluation
○: Excellent
×: Bad

[Curability (Masking property)]

After setting a coating, a masking tape (pressure-sensitive adhesive tape No. 720 made by Nitto Electric Industrial Co., Ltd.) is stuck onto the coating at 60° C. at prescribed intervals and the time till when a mark of the tape was not left on the coating or observing the state of the mark of the tape is measured.

[Pot life]

In a 100 cc cup is placed 70 g of the composition, and it is allowed to stand at 20° C. in the opened state for 2 hours. The initial viscosity (14 seconds) and the viscosity after 2 hours ($\eta_{2\,hr.}$) are measured by using Ford cup #4 provided in ASTM (American Society for Testing Materials) D-1200-58.

The change of viscosity (second) = $\eta_{2\,hr} - 14$

[Pencil hardness]

The pencil hardness of the cured coating is measured according to JIS K5400.

TABLE 1

| | Mercapto group-containing compound | Curability (Masking property) at 60° C. (hours) | Pot life (Change of viscosity) (second) | After 30 minutes at 60° C. and 7 days at room temperature | |
|---|---|---|---|---|---|
| | | | | Appearance | Pencil hardness |
| Ex. 1 | n-Dodecylmercaptan | 1 | 2.0 | ○ | H |
| Ex. 2 | γ-Mercaptopropyl-trimethoxysilane | 1 | 0.5 | ○ | H |
| Ex. 3 | 2-Ethylhexyl thioglycolate | 1 | 1.2 | ○ | H |
| Ex. 4 | CAPICURE 3-800 | 1 | 1.5 | ○ | H |
| Ex. 5 | Thiobenzoic acid | 1 | 0.8 | ○ | H |
| Com. Ex. 1 | — | 1 | 15.0 | × | H |

What we claim is:

1. A curable composition consisting essentially of:
(A) 100 parts by weight of one or more members selected from the group consisting of: (1) a polyester, (2) an ether ester block-copolymer, (3) a vinyl polymer selected from the group consisting of styrene, butyl acrylate, methyl methacrylate, allyl methacrylate, acrylamide and γ-methacryloxy-propyltrimethoxysilane, (4) a diallyl phthalate compound, and (5) a diallyl phthalate copolymer, said component (A) having in its molecule at least one silyl group represented by the formula (I):

wherein R$^1$ and R$^2$ are the same or different and each is hydrogen atom or a monovalent hydrocarbon group having 1 to 10 carbon atoms selected from the group consisting of an alkyl group, an aryl group and an aralkyl group, X is a halogen atom or a group selected from the group consisting of an alkoxy group, an acyloxy group, a ketoxymate group, an amide group, an acid amide group, an aminoxy group and a mercapto group, and a is 0, 1 or 2,
(B) 0.001 to 50 parts by weight of an organotin compound, and
(C) 0.1 to 20 parts by weight of a mercapto group-containing compound selected from the group consisting of an alkyl mercaptan, a mercapto group-containing carboxylic acid, a mercapto group-containing ester compound, a mercapto group-containing polyether, thiophenol and thiobenzoic acid.

2. The composition of claim 1, wherein said component (A) is a vinyl polymer having a molecular weight of 300 to 20,000.

3. The composition of claim 2, wherein said vinyl polymer is a vinyl polymer including an acrylic ester or a methacrylic ester.

4. The composition of claim 1, wherein said component (C) is n-dodecyl mercaptan.

5. A composition as in claim 1, wherein said component (A) is a polyester having a molecular weight of 300 to 8,000.

6. A curable composition as in claim 1, wherein said component (A) is an ether ester block-copolymer having a molecular weight of 300 to 20,000.

7. A curable composition as in claim 6, wherein the ether moiety in said ether ester block-copolymer has a molecular weight of 100 to 500.

8. A curable composition as in claim 1, wherein said component (A) is a diallyl phthalate monomer.

9. A curable composition as in claim 1, wherein said component (A) is a diallyl phthalate prepolymer having a molecular weight of not more than 20,000.

10. A curable composition as in claim 1, wherein said component (A) is a copolymer of diallyl phthalate with an acrylic or a methacrylic ester, said copolymer having a molecular weight of 300 to 20,000.

11. A curable composition as in claim 10, wherein the content of said diallyl phthalate is from 5 to 100% by mole.

12. A curable composition as in claim 1, wherein component (A) consists of styrene, butyl acrylate, methyl methacrylate, γ-methacryloxypropyltrimethoxysilane and acrylamide.

13. A curable composition consisting essentially of:
(A) 100 parts by weight of one or more members selected from the group consisting of a polyester, an ether ester block-copolymer, a vinyl polymer, a diallyl phthalate compound, and a diallyl phthalate copolymer, said component (A) having in its molecule at least one silyl group represented by the formula (I):

wherein $R^1$ and $R^2$ are the same or different and each is hydrogen atom or a monovalent hydrocarbon group having 1 to 10 carbon atoms selected from the group consisting of an alkyl group, an aryl group and an aralkyl group, X is a halogen atom or a group selected from the group consisting of an alkoxy group, an acyloxy group, a ketoxymate group, an amide group, an acid amide group, an aminoxy group and a mercapto group, and $a$ is 0, 1 or 2, (B) 0.001 to 50 parts by weight of an organotin compound, and (C) 0.1 to 20 parts by weight of a mercapto group-containing compound selected from the group consisting of an alkyl mercaptan, a mercapto group-containing carboxylic acid, a mercapto group-containing ester compound, a mercapto group-containing polyether, thiophenol and thiobenzoic acid, said polyester having a molecular weight in the range of 300 to 8,000 and being selected from the group consisting of polyesters of phthalic anhydride with a comonomer selected from the group consisting of allyl glycidyl ether, γ-glycidoxypropyltrimethoxysilane, and propylene oxide, said ether ester block-copolymer having a molecular weight in the range of 300 to 20,000 and being selected from the group consisting of block polymers prepared from (i) a polyester selected from the group consisting of polyesters of phthalic anhydride with a comonomer selected from the group consisting of allyl glycidyl ether, γ-glycidoxypropyltrimethoxysilane, and propylene oxide, and (ii) an alkylene oxide polymer, said vinyl polymer having a molecular weight in the range of 300 to 20,000 and consisting of one or more members selected from the group consisting of styrene, butyl acrylate, methyl methacrylate, allyl methacrylate, acrylamide and γ-methacryloxypropyltrimethoxysilane, said diallyl phthalate compound being selected from the group consisting of diallyl phthalate monomer and a prepolymer thereof having a molecular weight of not more than 20,000, and said diallyl phthalate copolymer being selected from the group consisting of (i) copolymers of diallyl phthalate monomer with an ester selected from the group consisting of acrylic esters and methacrylic esters, and (ii) copolymers of diallyl phthalate prepolymer having a molecular weight of not more than 20,000 with an ester selected from the group consisting of acrylic esters and methacrylic esters.

14. A curable composition as in claim 13, wherein component (A) consists of styrene, butyl acrylate, methyl methacrylate, γ-methacryloxypropyltrimethoxysilane and acrylamide.

* * * * *